Patented Oct. 9, 1951

2,570,664

UNITED STATES PATENT OFFICE 2,570,664

METHOD FOR PRESERVING VEGETABLES

Wolfgang Gündel, Dusseldorf-Oberkassel, Eckart Meyer and Willy Offermann, Dusseldorf-Derendorf, and Hedwig Fuchs, Dusseldorf, Germany, assignors to Henkel & Cie, G. m. b. H., Dusseldorf-Holthausen, Germany No Drawing. Application May 11, 1950, Serial No. 161,478. In Germany October 1, 1948

4 Claims. (Cl. 99—156)

This invention relates to a method and means for preventing the spoilage or sprouting of vegetables, particularly potatoes, beets, turnips, carrots, celery and the like.

An object of the present invention is the provision of inexpensive and effectively operating means which will facilitate the preservation and storage of potatoes and other vegetables.

Other objects of the present invention will become apparent in the course of the following specification.

The present invention is based on the discovery that phenyl carbamine acid isopropyl ester of the formula $C_6H_5.NH.CO.O.CH(CH_3)_2$ has the surprising capacity of most effectively preventing the spoilage or sprouting of vegetables, particularly potatoes, said capacity being much greater than that of 2.4-dichlor-phenoxy-acetic acid and 4-chlor-2-cresoxy-acetic acid, or of other esters of phenyl carbamine acid. A particular advantage of this compound is that it has no toxic effects on man or beast.

The compound is utilized by being first finely ground with an inert carrier, such as talcum, stone powder, kaolin or lime, or mixtures thereof, in amounts ranging from 5 to 100 times the amount of the compound. The mixture is dry-sprayed upon the vegetables while they are being stored.

It is also possible to provide the compound in the form of suitable solutions, such as alcohol solutions, and then apply these solutions to the storaged vegetables.

If desired, the compound can be used in the form of emulsions or suspensions in water, or aqueous solutions.

Amounts of the compound required to treat 100 kilograms of stored vegetables can vary within wide limits depending upon storage conditions and, if the compound is to be very effective, may range between 2 grams to 20 grams per 100 kilograms of the stored vegetables.

The great reaction inertia of phenyl carbamine acid isopropyl ester in relation to other chemicals makes it possible to use along with it other bacteria-destroying substances, such as 1-naphthyl-acetic acid-methyl ester and the like; due to its great resistance in respect to alkali media it may be used in lime or calcium hydrate-containing carriers, which were used in agriculture to prevent spoilage.

The preserving medium constituting the subject of the present invention can be applied when the vegetables are arranged in ricks, or are stored in cellars, boxes, silos, or the like.

The following example is given by way of illustration only:

2.5 kilograms of phenyl carbamine acid isopropyl ester are mixed with 97.5 kilograms kaolin. The resulting mixture constitutes a highly effective means for preserving vegetables and preventing their premature spoilage or sprouting. The mixture is sprayed over the vegetables.

Second example

An equally effective compound is obtained by mixing 1 kilogram of phenyl carbamine acid isopropyl ester, 3 kilograms of 1-naphthyl-acetic acid-methyl ester and 96 kilograms talcum.

Third example

Same as second example, but with talcum replaced by stone powder.

It is apparent that these examples have been given solely by way of illustration and not by way of limitation and that they are subject to many variations and modifications without departing from the scope of the present invention. All such variations and modifications are to be included within the scope of the present invention.

What is claimed is:

1. The process of protecting vegetables from spoilage which comprises the step of applying phenyl carbamine acid isopropyl ester to the vegetables.

2. The process of protecting vegetables from spoilage which comprises the step of applying to the vegetables a product consisting of a mixture of a solid comminuted carrier and phenyl carbamine acid isopropyl ester.

3. The process of protecting vegetables from spoilage which comprises the step of applying to the vegetables a solution of dissolved phenyl carbamine acid isopropyl ester.

4. The process of protecting vegetables from spoilage which comprises the step of applying to the vegetables phenyl carbamine acid isopropyl ester emulsified in an aqueous solution.

WOLFGANG GÜNDEL.
ECKART MEYER.
WILLY OFFERMANN.
HEDWIG FUCHS.

REFERENCES CITED

The following references are of record in the file of this patent:

UNITED STATES PATENTS

| Number | Name | Date |
|---|---|---|
| 2,026,619 | Etzelmiller | Jan. 7, 1936 |
| 2,093,865 | Denny | Sept. 21, 1937 |
| 2,341,868 | Hitchcock | Feb. 15, 1944 |